Nov. 30, 1954     W. M. ROYER     2,695,742
APPARATUS FOR CONTROLLING FLOW OF SOLID MATERIAL
Filed Dec. 27, 1949     2 Sheets-Sheet 1
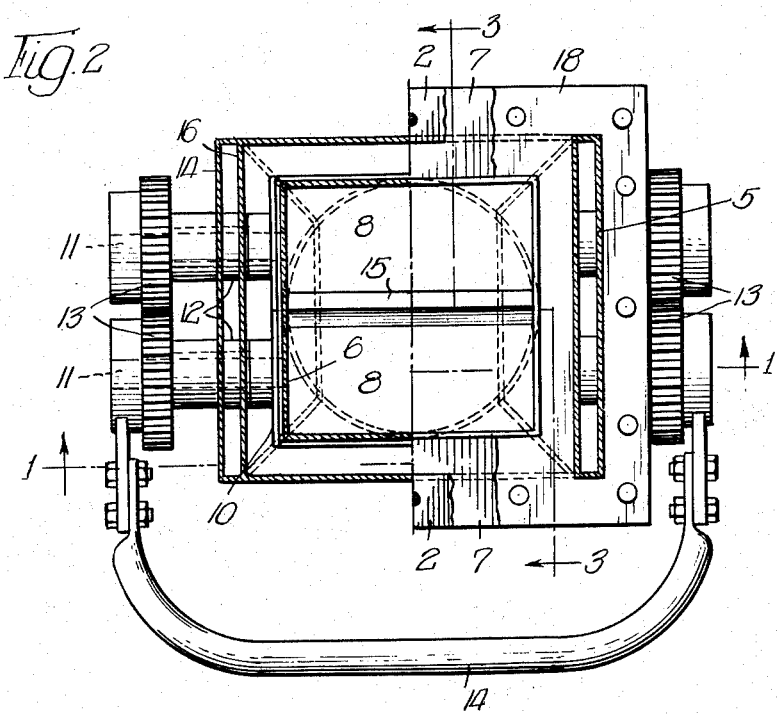
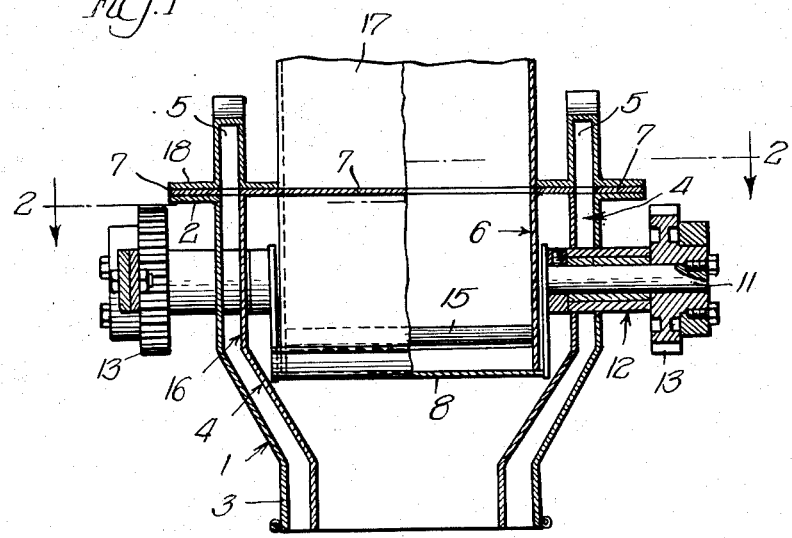
INVENTOR.
William M Royer,
BY Nov. 30, 1954     W. M. ROYER     2,695,742
APPARATUS FOR CONTROLLING FLOW OF SOLID MATERIAL
Filed Dec. 27, 1949     2 Sheets-Sheet 2
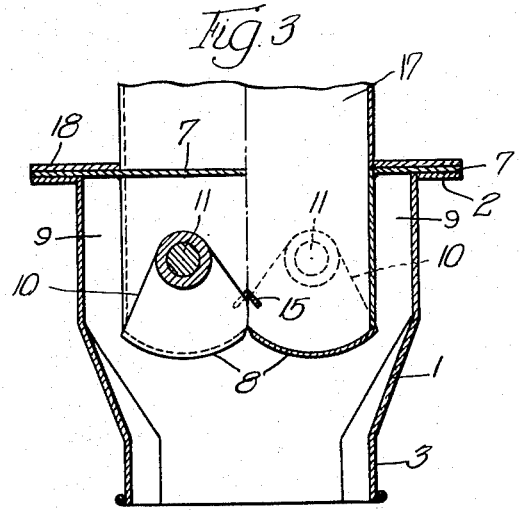
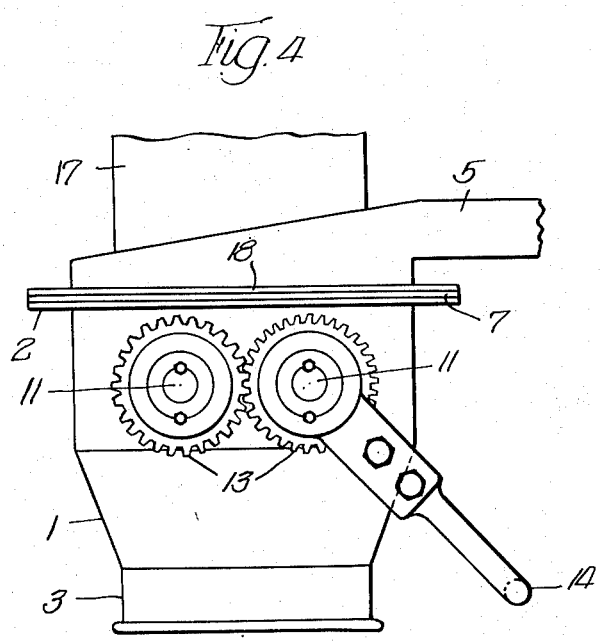
INVENTOR.
William M. Royer,
BY
Cromwell, Greist + Warden
Attys

United States Patent Office

2,695,742
Patented Nov. 30, 1954

2,695,742

APPARATUS FOR CONTROLLING FLOW OF SOLID MATERIAL

William M. Royer, Decatur, Ill., assignor to A. E. Staley Manufacturing Company, Decatur, Ill., a corporation of Delaware Application December 27, 1949, Serial No. 135,235

2 Claims. (Cl. 226—58)

This invention relates, generally, to apparatus for controlling the flow of solid materials, such as may be used in discharging material from a bin or hopper into a receptacle.

The apparatus may be adapted for use wherever it is desired to control the flow of solid materials although it is especially useful where the solid is finely divided. It has been used to advantage as a bin gate, in the bagging of flour and meal. However, it can be used as a valve means between containers in general, as between bins or between a bin and a conveyor, for example.

Various other types of apparatus incorporating valves for controlling the flow of solid materials are known. One common type is that wherein a sheet of metal slides in slots disposed transversely to the flow of material. This sheet or plate is pulled out to open the valve in the apparatus and pushed in to close the valve; or the plate may operate on a pivot so that it swings in and out. Their operation is similar to a shutter.

One disadvantage of this shutter-type valve in such apparatus is that some of the powdered material invariably is carried outside the spout where it becomes contaminated and is then carried back into the material when the plate is pushed back into the spout. This is a serious handicap where contamination must be avoided, e. g. in the food industry.

Another disadvantage is that the shutter-type valve inherently causes loss of fine material, since the slot must be loose enough to permit travel of the plate, which in turn is complicated by the tendency for the slot to become clogged with material, and in opening by the drag resulting from the material above in the container pressing down on the plate. Some of the material trapped in the slots is occasionally dislodged, and if it has undergone deterioration or spoilage, it contaminates the rest of the material.

The shutter-type valve in this type of apparatus also is associated with considerable dustiness in operation, since the air forced out of the receiving vessel by the material flowing into it spurts out around the shutter plate and slots, carrying dust with it. This is objectionable not only from loss and sanitation considerations, but is actually hazardous where the dust is combustible, as in a starch or flour mill.

Accordingly, it is a principal object of this invention to provide an improved apparatus for controlling the flow of solid material from a bin, hopper or the like into a container which eliminates losses of material thru leakages, dusting, and faulty opening and closing.

An important object of the invention is an apparatus for use in filling containers with free flowing solids from a source of supply, wherein vents are provided in the apparatus to vent the interior of the containers attached for filling, with the opening in said apparatus for solids flow utilizing to a maximum degree the cross-sectional area of the apparatus.

Another object is to provide in such apparatus an improved valve with its shut-off mechanism disposed entirely within a dust-tight housing.

Another object is to provide in such apparatus an improved valve designed to prevent or minimize leakage thru clearances between the cooperating members.

Another object is to provide in such apparatus an improved valve in which sliding friction is reduced to a minimum and in which the weight of the material being controlled tends neither to open nor close the valve.

Another object is to provide in such apparatus an improved valve designed to eliminate dusting through the provision of passageways for exhausting displaced air and entrained dust into a suitable receptacle.

Another object is to provide in such apparatus an improved valve which is easy to operate, positive in action and more sanitary in that the shut-off member is contained within a dust-tight housing.

Another object is to provide in such apparatus an improved valve comprising two cooperating gate members wherein closure of the gates is effected in a manner to avoid entrapment of material between the mating edges.

Other objects and advantages will be apparent from the following detailed description of a preferred embodiment of my invention, in which the valve is adapted for use as a bin gate in the conventional operation of filling bags with a powdered material, reference being made to the annexed drawings wherein:

Fig. 1 is a vertical, sectional view of an apparatus forming one embodiment of the invention taken substantially on line 1—1 of Fig. 2.

Fig. 2 is a top plan view, partly broken away, taken substantially on line 2—2 of Fig. 1.

Fig. 3 is a vertical, sectional view taken substantially on line 3—3 of Fig. 2.

Fig. 4 is a left-end elevational view of Fig. 1.

Referring now more specifically to the drawings, the apparatus comprises a section of delivery or discharge conduit 1 carrying about its upper end a flange 2 for fastening it to a conduit or bin 17 by means of flange 18. The lower end is tapered and ends in a short straight section 3 around which the mouth of a bag is fitted prior to starting the filling operation.

In the form illustrated, this section of conduit is rectangular at the top and tapers to a round bottom outlet. Two sides of this section have spaced-apart walls or baffles 16 providing vent passageways 4 for the removal of dusty air forced out of the receptacle being filled. These passageways lead upwardly to take-off ducts 5 connected to a receiver for the dust-laden air, which may be a dust collector. They may also lead into the top of the bin from which the material is drawn.

Within this section is centered a short length of smaller conduit 6, having a flange 7 supporting it in a fixed, spaced relationship to the outer or main conduit. This inner conduit or thimble 6 extends downwardly to a level just short of a pair of gates or shut-off members 8.

These gates 8 in closed position extend across and effectively close the lower, outlet end of the inner conduit 6. They are made of a metal sheet curved to a radius such that in opening, the gates swing into the recesses 9 provided between the inner and outer conduits.

The curved plates are welded at their ends to arcuate sector-shaped supporting members 10 which are fixedly mounted on shafts 11 turning in bearings 12. Meshed gears 13, fixedly mounted on shafts 11, coordinate to open or close both gates simultaneously when handle 14, also fixedly mounted on shafts 11, is raised or lowered.

The gates or valve members 8 meet in their closed position in a close-fitting joint between their inner, beveled edges. This efficient closure is furthered by and shielded by a length of appropriately curved or bent (e. g. V-shaped) metal strip 15 placed parallel to and only slightly above the joint, in such a manner that the gates barely clear in opening and closing.

This metal strip 15 acts as a shield or diverting member providing an area beneath which closure of the gates is effected in a manner avoiding entrapment of material between the mating edges.

Likewise, the walls 6 of the inner conduit extend down very close to the gate surface. Consequently, leakage is eliminated, since a powdered material would have to pass through these slight clearances and then flow uphill to get over either edge of the gates.

In an actual operation of the illustrated embodiment of my invention, an operator places the mouth of an empty bag tightly and securely around the outlet section 3, raises the handle 14 causing the gates 8 to swing apart and upwardly behind the walls 6 thereby quickly opening the valve formed by these gates and permitting material to flow into the bag. Dust-laden air forced out of the bag passes upwardly and out thru the passageways 4 to a dust collector. The valve is quickly and positively closed by bringing the gates 8 together so that the beveled edges meet under the shield 15.

Having the dust vent passageways 4 located at one pair of opposite sides of the fitting or conduit 1, with the gate-receiving recesses defined by the walls 6 located adjacent the other pair of opposite sides, serves to make most effective use of the cross-sectional area of the conduit 1.

It is intended that the embodiment shown and described herein is illustrative only and is not to be interpreted as limiting the invention to a particular form.

Having described the invention, what is claimed as new is:

1. Apparatus particularly adapted for use in filling containers with free-flowing solids from a source of supply, comprising, in combination, a fitting having an upper portion which is rectangular in horizontal cross-section with the top inlet opening thereof being adapted to be connected with a source of supply of free-flowing solids, said fitting having a bottom discharge opening to which a container may be connected for filling, inner baffle walls spaced from two opposite sides of said fitting and extending from adjacent said top inlet opening to adjacent said bottom discharge opening and defining two vent passageways connecting the interior of a container attached to said bottom discharge opening with the top of said fitting; a rectangular thimble member disposed within said upper portion of said fitting with one pair of the opposite vertical side walls of said thimble being located adjacent to said inner baffle walls and with the other pair of the opposite vertical side walls of said thimble being spaced away from the adjacent vertical side walls of said fitting not having baffles, a pair of mating valve members disposed for closing and opening the bottom end of said thimble member, supporting means for each of said valve members whereby each is rotatable about a horizontal axis which is perpendicular to the planes of said baffle walls, operating means for opening and closing said valve members, said valve members in the open position being disposed in the spaces between said other pair of the opposite vertical side walls of said thimble and the adjacent vertical side walls of said fitting.

2. Apparatus for controlling the gravity discharge of dusty solids from the bottom end of a delivery conduit into a container to be filled comprising, a fitting having an upper portion which is rectangular in horizontal cross-section and a bottom discharge portion having a bottom discharge opening to which the mouth of a container to be filled may be connected, inner baffle walls extending across two of the opposite side walls of said upper fitting portion in spaced relationship therewith and extending down to adjacent said bottom discharge opening in spaced relationship with at least a portion of the interior of said bottom discharge portion, said baffles thereby defining vent passageways for dust removal connecting the interior of a container attached to said bottom discharge opening to the top of said fitting, dust take-off fittings connected to the tops of each of said vent passageways, a rectangular thimble member disposed within said upper portion of said fitting with the bottom end of said thimble discharging into said bottom discharge portion and with the top end of said thimble adapted to be attached to the bottom end of a delivery conduit for dusty solids, at least one pair of opposite side walls of said thimble being spaced from the adjacent side walls of said upper portion of said fitting so as to provide enclosed valve member receiving pockets therewith, flange means closing off the tops of said pockets, a pair of mating valve members disposed for closing and opening the bottom end of said thimble member, support means for each of said valve members whereby each is rotatable about a horizontal axis extending parallel to valve member receiving pockets, operating means for opening and closing said valve members having a control member which projects exteriorly of said fitting so that the valve may be operated from the outside, and said valve members in the open position being turned up into said pockets provided therefor.

References Cited in the file of this patent

UNITED STATES PATENTS

| Number | Name | Date |
|---|---|---|
| 642,161 | Sargent et al. | Jan. 30, 1900 |
| 689,444 | Williams | Dec. 24, 1901 |
| 737,200 | Bowers et al. | Aug. 25, 1903 |
| 2,075,931 | Eades | Apr. 6, 1937 |
| 2,078,313 | Briggs | Apr. 27, 1937 |
| 2,204,019 | Koppers | June 11, 1940 |